Patented Dec. 8, 1931

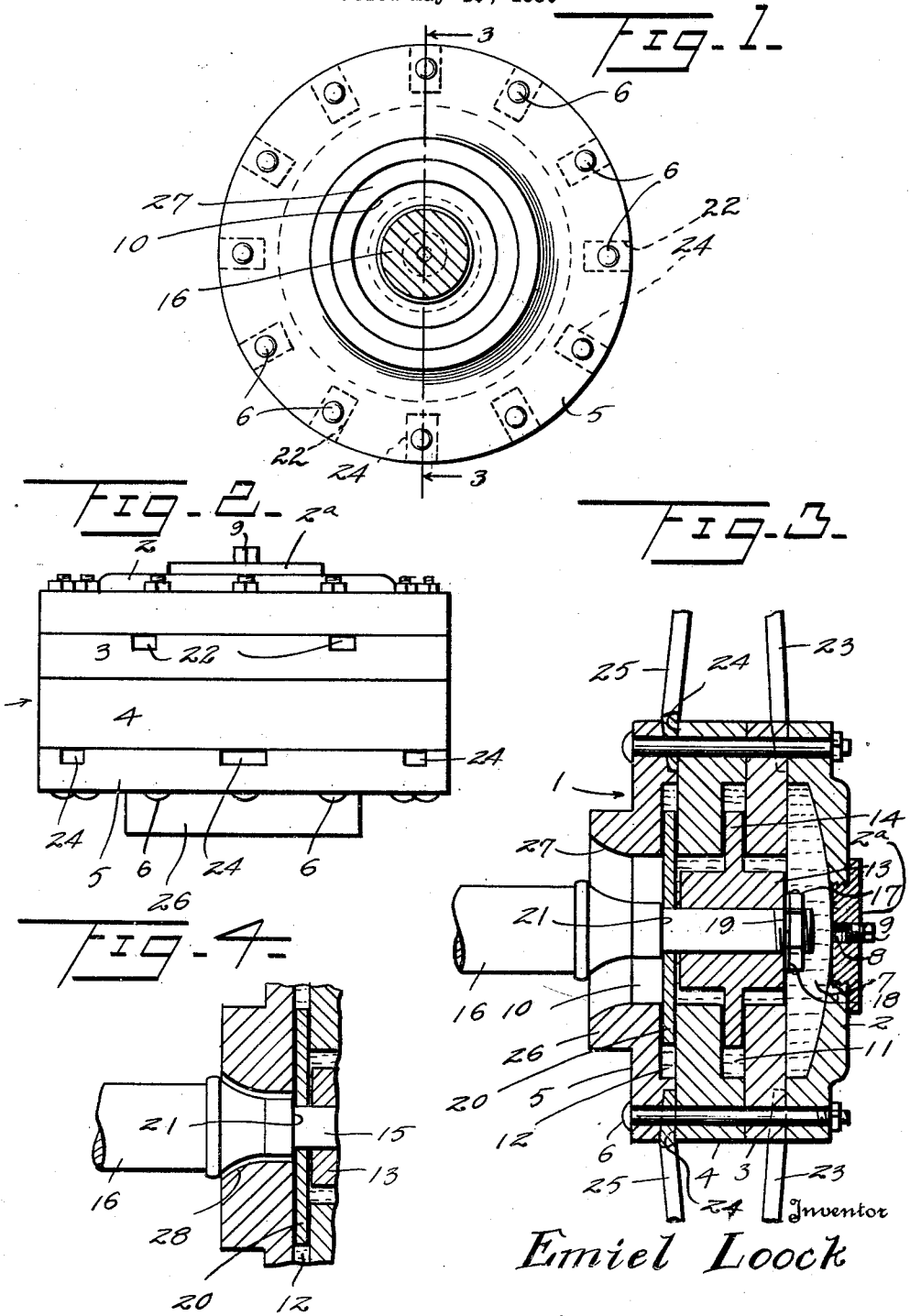

1,835,231

UNITED STATES PATENT OFFICE

EMIEL LOOCK, OF OWENSVILLE, ARKANSAS

WHEEL HUBS

Application filed May 15, 1930. Serial No. 452,788.

This invention relates to wheel hubs, and has for one of its objects to provide a novel device of this character which shall be adapted to permit the rate of motion of a heavily loaded vehicle descending a grade to be controlled with comparatively little effort, to permit a heavily loaded vehicle to be hauled up-grade with comparative ease, and to permit a heavily loaded vehicle to be easily hauled over obstructions.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a view in side elevation of the hub mounted upon an axle, the axle being in vertical section;

Figure 2 is a plan view of the hub;

Figure 3 is a sectional view taken on the plane indicated by the line 3—3 of Figure 1; and Figure 4 is a sectional view illustrating a slightly modified form of the hub.

The hub 1 is of sectional formation, and the sections 2, 3, 4 and 5 thereof, which are in the form of discs, are secured together by bolts 6. The outer disc 2 is provided in its inner side with a recess 7 which constitutes a lubricant reservoir. The disc 2 is provided with a filler opening 8 for the reservoir 7, and such opening is closed by a removable plug 9.

The intermediate discs 3 and 4 and the inner disc 5 are formed to provide an axial bore 10 which communicates at its outer end with the reservoir 7 and opens at its inner end through the disc 5. That side of the disc 4 facing the disc 3 and that side of the disc 5 facing the disc 4, are formed to provide annular grooves 11 and 12, respectively, which communicate with the bore 10. The groove 11 is located at the vertical center of the hub 1, and the groove 12 is located inwardly beyond said center.

An axle box 13, which is shorter than the hub 1 and has an external diameter less than the diameter of the bore 10, is connected to the hub through the medium of an annular flange 14 arranged in the groove 11. The flange 14 is formed on the periphery of the axle box 13 and is located centrally between the ends of the box, and it is smaller diametrically than the groove 11, to permit the axle box and hub 1 to have relative forward and rearward movements. The flange 14 maintains the axle box 13 in the center of the hub 1.

The box 13 is adapted to be secured to the spindle 15 of an axle 16 by a nut 17 which is secured in place by a lock washer 18 and between which and the box is arranged a washer 19. A grease retaining disc 20, which is mounted upon the spindle 15 between the box 13 and an annular shoulder 21 on the spindle, is arranged in the groove 12. The disc 20 is smaller diametrically than the groove 12 so as not to interfere with relative movements between the hub 1 and box 13.

That side of the disc 3 which faces the disc 2 is formed to provide an annular series of relatively spaced sockets 22 for the reception of the inner ends or spokes 23, and that side of the disc 5 that faces the disc 4 is formed to provide an annular series of relatively spaced sockets 24 for the reception of the inner ends of spokes 25. The sockets 22 and the sockets 24 are arranged in staggered relation, and the bolts 6 pass through the sockets and through the spokes 23 and 25 to secure the latter to the hub 1.

The disc 5 is provided with a sand band 26 which is formed integrally therewith, and the sand band may be provided with an opening having a diameter equal to that of the bore 10, as shown at 27 in Figure 3, or it may have an opening having a diameter smaller than that of the bore, as shown at 28 in Figure 4. In each form of the sand band 26, the opening thereof will be larger diametrically than that portion of the spindle 15 surrounded by the sand band so as to permit the hub 1 and box 13 to have relative forward and rearward movements.

As the hub 1 is rotatably associated with the axle box 13 and associated therewith for forward and rearward movements with respect thereto, the hub is adapted to permit the rate of movement of a heavily loaded vehicle descending a grade to be easily controlled and to permit the vehicle to be easily hauled up-grade. The axle box 13 contacts with the bottom wall of the bore 10 of the hub 1 while the wheel is travelling over a smooth stretch of road, and the hub and axle box move forwardly and rearwardly with respect to each other when the wheel moves into and out of a depression or encounters and moves over rocks and other obstacles in the road. The hub 1 and axle box 13 also move forwardly and rearwardly with respect to each other when the wheel starts down or up a grade. The disc 20 is larger diametrically than the bore 10 of the hub 1 so that, in any position of the axle box 13 with respect to the hub, it will close the inner end of the bore and thus prevent the escape of the grease from the hub. The grease, in addition to functioning as a lubricant, tends to prevent any sudden movement of the hub 1 and axle box 13 with respect to each other. The central portion 2ª of the disc 2 is removable to permit of access to the parts 17—19.

While I have described the principle of the invention, together with the structure which I now consider the preferred embodiment thereof, it is to be understood that the structure shown is merely illustrative and that such changes may be made, when desired, as fall within the scope of the invention as claimed.

I claim:—

In combination, a wheel hub having an axial bore and provided at its vertical center with an annular groove surrounding the bore and communicating therewith, an axle box arranged in and smaller axially and diametrically than the bore and normally resting upon the bottom wall of the bore, the axle box being adapted to be secured to the spindle of an axle, an annular flange secured to and surrounding the axle box and arranged in said groove and smaller diametrically than the same, the hub being provided near its inner end with an annular groove surrounding said bore and communicating therewith, and a grease retaining ring adapted for application to the spindle and arranged in said last groove and smaller diametrically than the same and larger diametrically than the bore.

In testimony whereof I hereunto affix my signature.

EMIEL X LOOCK.
his / mark